(12) United States Patent
McDonald et al.

(10) Patent No.: US 6,778,658 B1
(45) Date of Patent: *Aug. 17, 2004

(54) DIGITAL DIALED DIGIT UNLOCK METHOD AND SYSTEM

(75) Inventors: Randy M. McDonald, Roswell, GA (US); Odie H. Garrison, Alpharetta, GA (US); Terry R. Droke, Woodstock, GA (US); Mort P. Burnett, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 352 days.

This patent is subject to a terminal disclaimer.

(21) Appl. No.: 09/999,293

(22) Filed: Nov. 15, 2001

(51) Int. Cl.[7] .............................................. H04M 7/00
(52) U.S. Cl. .................. 379/230; 379/242; 379/355.05; 379/354; 379/93.18; 379/352; 379/355.01
(58) Field of Search .............................. 379/93.18, 242, 379/352, 354, 355.01, 355.05

(56) References Cited

U.S. PATENT DOCUMENTS

| | | | |
|---|---|---|---|
| 3,920,926 A | * 11/1975 | Lenaerts et al. | 379/93.18 |
| 4,707,854 A | * 11/1987 | Mayer | 379/355.05 |
| 5,805,694 A | * 9/1998 | Kim | 379/354 |
| 5,828,745 A | * 10/1998 | Jeoung | 379/242 |

OTHER PUBLICATIONS

U.S. Ser. No. 09/999,276, filed Nov. 15, 2001, entitled "Analog Dialed Digit Unlock Method and System", Inventors: McDonald et al.

* cited by examiner

Primary Examiner—Ahmad F. Matar
Assistant Examiner—Marie C. Ubiles
(74) Attorney, Agent, or Firm—Merchant & Gould

(57) ABSTRACT

A method and system for providing a dialed digit unlock and edit feature for a digital telephone connected to an advanced intelligent network (AIN) wireline network is disclosed. The digital telephone sends at least one digit of a called party number to an originating ISDN switch. The originating ISDN switch determines whether a Q.931 CALL PROCEEDING call control message has been sent from the originating ISDN switch to the digital telephone. If so, then the dialed digit unlock and edit feature is disabled. However, if the Q.931 CALL PROCEEDING call control message has not been sent, then the originating ISDN switch determines whether a key to enable the dialed digit unlock and edit feature has been entered on the digital telephone. If the key has been entered, then the last digit(s) entered for the called party number are erased and the originating ISDN switch awaits a new digit(s) to be entered into the digital telephone.

17 Claims, 3 Drawing Sheets

DIGITAL DIALED DIGIT UNLOCK METHOD AND SYSTEM

REFERENCE TO RELATED APPLICATION

This application is related to the subject matter disclosed in U.S. patent application Ser. No. 09/999,276, entitled "Analog Dialed Digit Unlock Method and System", filed on Nov. 15, 2001, which is assigned to a common assignee and which is incorporated herein by reference.

TECHNICAL FIELD

This invention relates to a method and system for providing telecommunications services, and even more particularly relates to a digital dialed digit unlock method and system for a wireline telecommunications environment.

BACKGROUND OF THE INVENTION

Dialing telephone digits is a daily activity for most people. As more and more people subscribe to telephone service, longer and longer numbers are dialed to differentiate subscriber lines. For example, in the past, a seven digit number (XXX-XXXX) may have been enough to differentiate subscriber lines within a calling area. However, as more subscriber lines are added within a calling area, more digits have been needed to differentiate subscriber lines. For example, a ten digit number (XXX-XXX-XXXX) is often needed to differentiate subscriber lines even within a local calling area. As more digits are required for dialing (even for local dialing), more misdialing occurs. Oftentimes, a calling party will enter a few numbers of the called party's number and then realize that they have entered an incorrect digit. In the wireline environment, there is typically no way to correct these erroneous digits. The calling party must hang up, listen for a new dial tone and redial the called party's number. Sometimes, when trying to hang up, a calling party will instead only flash their telephone line causing further misdialing and further frustration.

With wireless telephones, a clear key may be used to correct a digit if it has been incorrectly entered. However, in a wireline telecommunications environment, Integrated Services Digital Network (ISDN) phones are not equipped with such clear keys. It is time-consuming and annoying when users make a mistake after entering multiple digits of a telephone number and then must redial the entire telephone number. Thus, there is a need for a digital dialed digit unlock method and system.

SUMMARY OF THE INVENTION

In one embodiment, the invention is a method and system for providing a dialed digit unlock and edit feature for an Integrated Services Digital Network (ISDN) telephone connected to an advanced intelligent network (AIN) wireline network is disclosed. The ISDN telephone sends at least one digit of a called party number to an ISDN switch. The ISDN telephone or ISDN switch determines whether Q.931 CALL PROCEEDING call control message has been sent from the ISDN switch to a destination central office. If so, then the dialed digit unlock and edit feature is disabled. However, if the Q.931 CALL PROCEEDING call control message has not been sent, then the ISDN switch determines whether a key to enable the dialed digit unlock and edit feature has been entered on the ISDN telephone. If the key has been entered, then the last digit(s) entered for the called party number are erased and the ISDN switch awaits a new digit(s) to be entered into the ISDN telephone.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
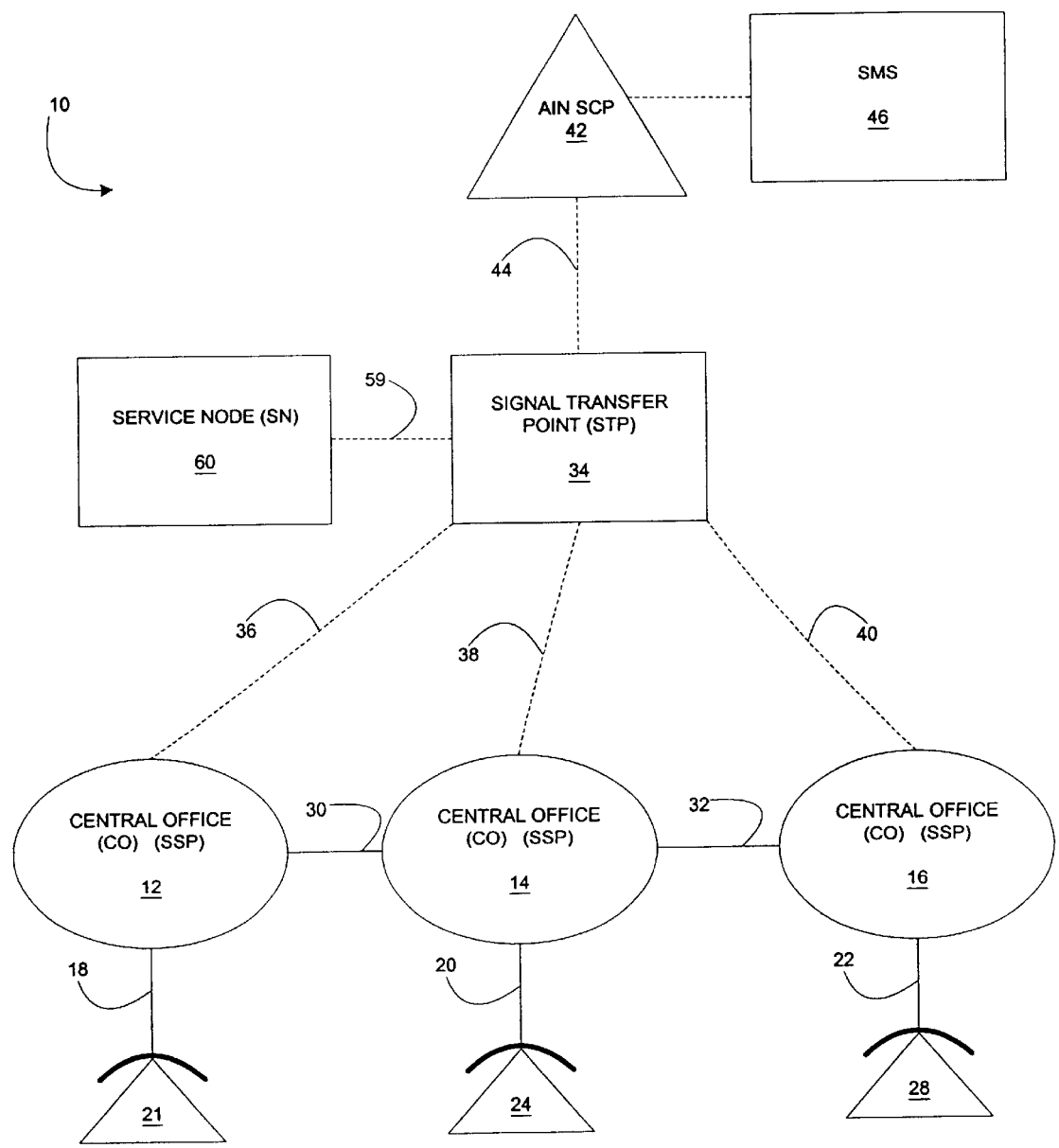
FIG. 1 is a block diagram of an exemplary advanced intelligent network (AIN).

The present invention is directed toward a method and system for unlocking the dialed digits from an ISDN telephone so that revisions to the dialed digits may be made. In one embodiment, the invention is implemented as part of an ISDN network connected to an advanced intelligent network (AIN).

Referring now to the drawings, in which like numerals represent like elements throughout the several figures, aspects of the present invention and the advanced intelligent network (AN) will be described.

The modem public switched telephone network (PSTN) has separate signaling paths for voice signals (or other customer-utilized communication circuits) and for control signals, which include information transmitted throughout the network to control the connection and disconnection of the voice circuits. In the late 1970s and early 1980s, American Telephone & Telegraph Company (AT&T) developed an early species of common channel interoffice signaling (CCIS). CCIS is essentially a network architecture for a switched telephone network in which information about a telephone call is transmitted over high-speed data links that are separate from the voice circuits that are used to transmit the signals of the call itself. Early in the development of common channel interoffice signaling, it was recognized that the interoffice data signaling links could be designed to provide high-speed digital data that could first determine whether a call could be completed prior to assigning trunk capacity to set up the voice link. Thus, with common channel interoffice signaling, the identity of the dialed number can be transmitted over the interoffice signaling data links from the originating central office to the terminating central office, which is the central office that services the dialed or called number. CCIS offers benefits such as speeding up the setting up and tearing down of phone calls. CCIS also allows much more information (such as the calling number, a message, etc.) to be carried about the phone call than that carried on in-band signaling.

If the dialed number is busy, data representing this information is transmitted back over the interoffice signaling link to the originating central office that locally provides an audible busy signal to the caller. Therefore, no long distance trunk capacity is occupied during this process, and the voice circuits remain free for other uses. If the dialed number is not busy, various devices in the network respond to the information about this call to assign interoffice trunks to set up a connection for the call. While the call is being set up, the originating central office, based on a signal from the terminating central office, returns an audible ring back tone (RBT)

to the caller. Once the dialed number is answered, an answer signal is passed from the terminating central office to the originating central office, the ring back tone is terminated, and the call is completed.

The public switched telephone network (PSTN) that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. As shown in FIG. 1, each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP is the AIN component of a typical electronic central office switch used by a local exchange carrier. The terms "SSP", "switch" and "central office" are used interchangeably hereinafter and are understood to refer to a telecommunications switch having AIN capability and which may be utilized for connecting voice channel circuits, including voice channel lines, such as trunk circuits 30 and 32.

As shown in FIG. 1, switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by pay telephone 21 and standard telephone sets 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services.

Additional devices for implementing advanced network functions within the AIN 10 are provided by regional STPs (not shown), regional AIN SCPs (not shown), and a service management system (SMS) 46. The STP 34 is connected to the SSPs via connections 36, 38 and 40. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well-known to those skilled in the art and will not be further described herein. For more information regarding the AIN protocol, see Bellcore Specification GR-1298-CORE Switching Systems Generic Requirements for AIN 0.1, which is incorporated herein by reference.

The STP 34 may also be connected via a primary rate interface (PRI) 59 to a service node 60. The service node is used to implement functions such as voice-to-text and text-to-voice conversions, among other finctions. Those skilled in the art are familiar with service circuit nodes, which are physically implemented by the same types of computers that embody the SCP 42. In addition to the computing capability and data base maintenance features, service nodes use ISDN lines and may include DTMF signal recognition devices, tone generation devices, voice synthesis devices and other voice or data resources. While service nodes are physically quite similar to the SCP 42, there are some important differences in the uses to which they are put.

Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for database look-up and routing services that take place prior to the logical completion of the call, i.e., the provision of a ringing signal to the called subscriber line and ring back to the calling subscriber. By contrast, service nodes are used principally when some custom feature or service is needed that requires an audio connection to the call or transfer of a significant amount of data to a subscriber over a switched connection during or following a call.

Figure 2:
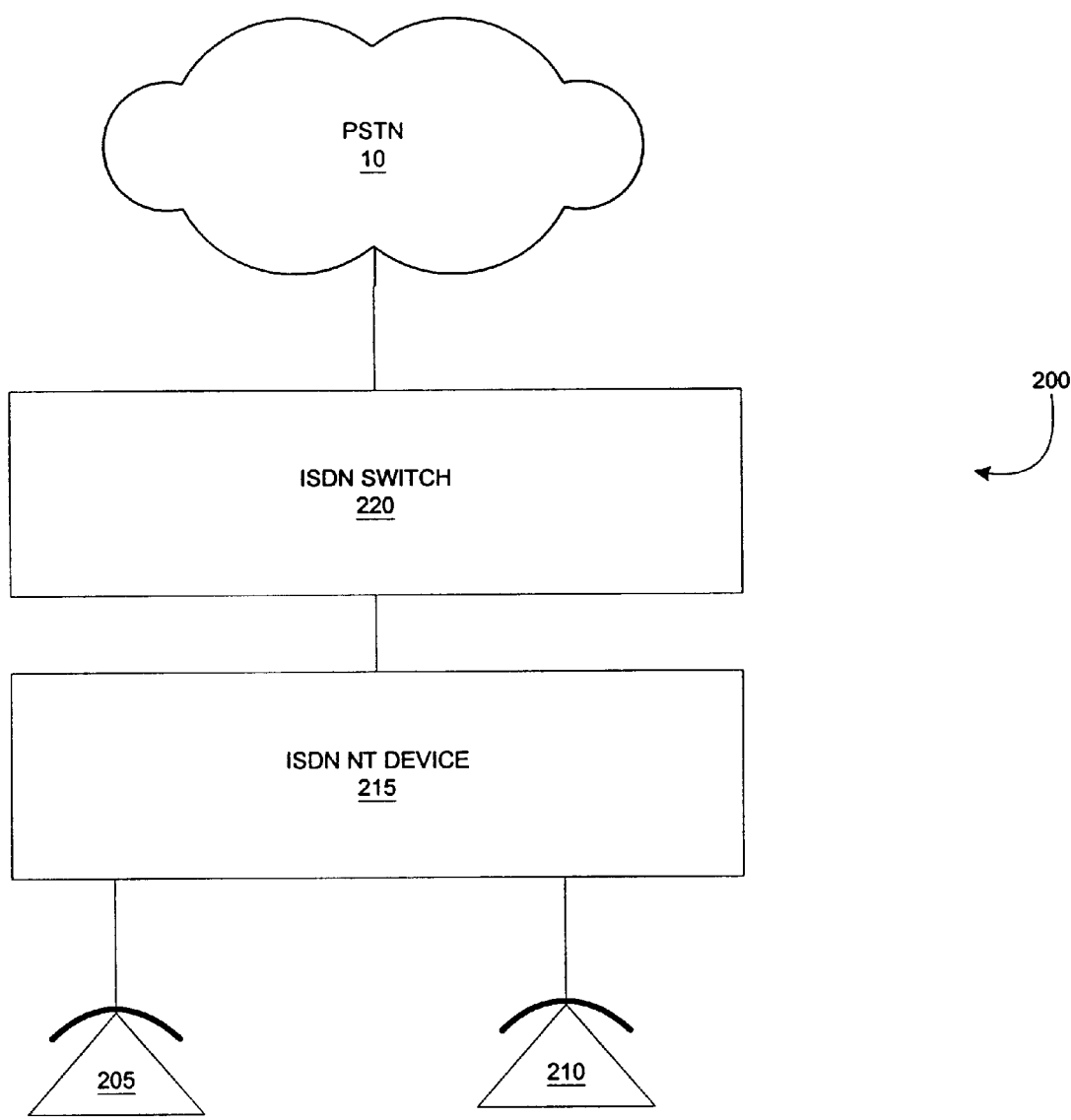
FIG. 2 is a block diagram of an exemplary ISDN network connected to a public switched telephone network (PSTN).

Referring now to FIG. 2, a block diagram of an exemplary ISDN network 200 connected to a public switched telephone network (PSTN) 10 will be described. The present invention operates in a digital network, such as ISDN network 200.

A number of digital, or ISDN, telephone 205, 210 are connected to an ISDN network termination (NT) device 215. The ISDN NT device 215 is a black box, called an NT1, which provides an interface between an ISDN loop and an S or T interface terminal, such as an ISDN telephone or personal computer terminal adapter (PSTA). The NT1 typically sits on the customer's premises and communicates with an ISDN switch (or central office) 220. Typically, all ISDN terminals, such as telephones 205, 210 are plugged into the ISDN NT device 215. The basic ISDN NT device 215 functions are line transmission termination, Layer 1 line maintenance functions and performance monitoring, Layer 1 multiplexing and Interface termination.

As mentioned above, the ISDN NT device 215 is connected to an ISDN switch 220. The ISDN NT device sends voice and data packets over 2B channels and signaling packets over a D channel. The ISDN NT device connection to the ISDN switch may terminate in a line card (not shown) of the ISDN switch. The ISDN switch receives Q.931 packets including voice, data and signaling packets through the ISDN NT device and routes the calls from ISDN telephones 205, 210 accordingly. Q.931 (also referred to as ITU-T Recommendation I.451) is a message-oriented signaling protocol in the ISDN D-channel. The protocol describes what goes into a signaling packet and defines the message type and content, including call set-up and take down, called party number, calling party number, bearer capability and status checking.

The ISDN switch may also be connected to a public switched telephone network (PSTN) 10, such as an advanced intelligent network (AIN) (FIG. 1) so that calls may be routed outside of the digital ISDN network 200.

Figure 3:
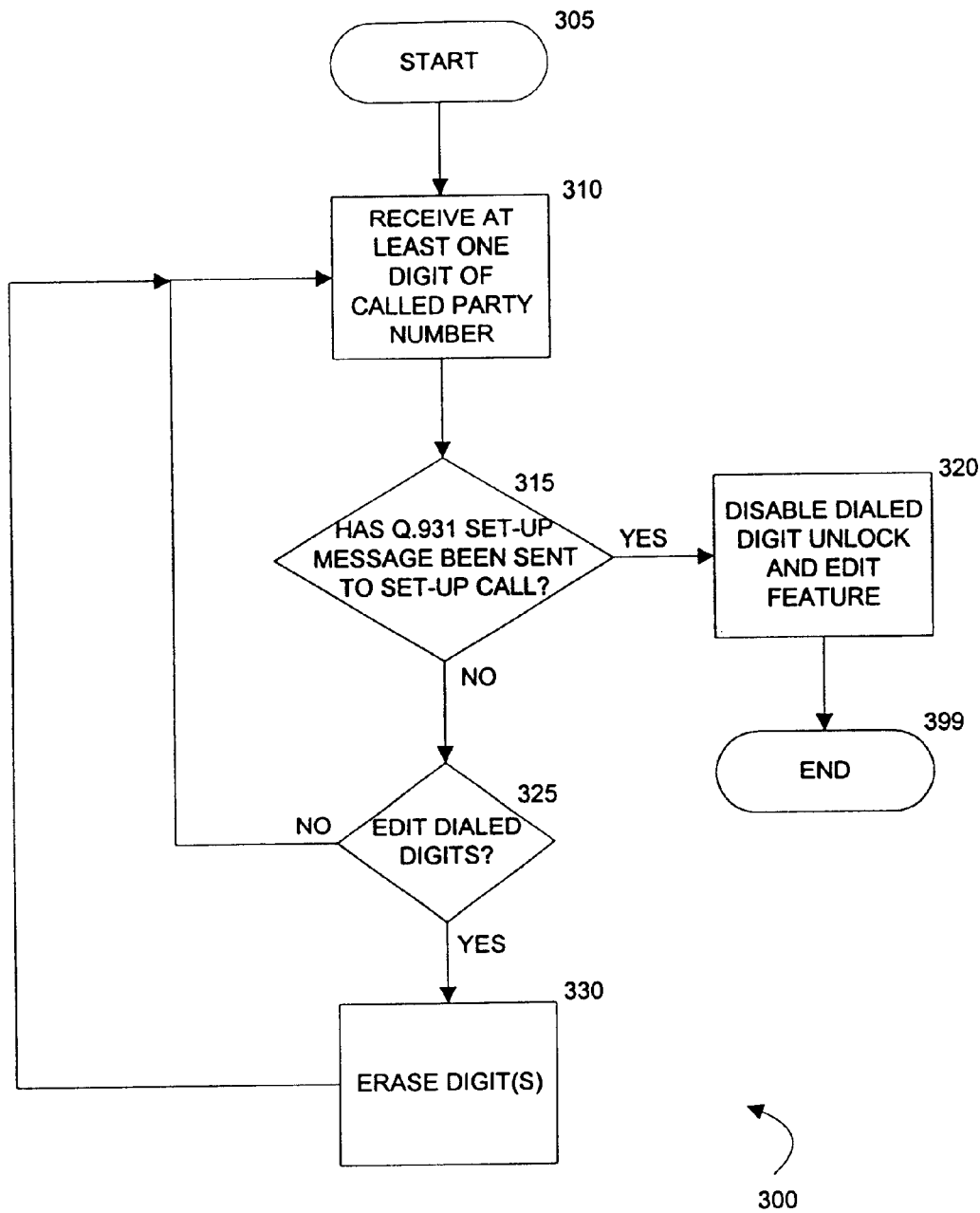
FIG. 3 is a flow diagram illustrating a method for unlocking the dialed digits from an ISDN telephone so that revisions to the dialed digits may be made in accordance with an embodiment of the present invention.

Having described an exemplary operating environment above in reference to FIGS. 1 and 2, a flow diagram illustrating a method 300 will be described in reference to FIG. 3. The method 300 is for unlocking and editing dialed digits from a digital telephone, such as an ISDN telephone, in accordance with an embodiment of the present invention.

The method 300 begins at start step 305 and proceeds to step 310 when a user begins entering digits on an ISDN wireline telephone and the digits are received by the originating ISDN switch.

The method then proceeds to decision step 315 to determine whether a Q.931 CALL PROCEEDING call control message has been sent by the originating ISDN switch to the ISDN telephone 205. It should be understood that typically an ISDN switch, such as ISDN switch 220 (FIG. 2), receives the dialed digits from an ISDN telephone 205, such as by receiving Q.931 call control messages from the ISDN telephone 205. The originating ISDN switch uses digit interpretation tables and a foreign area translator (FAT) to determine where to route the call based on the dialed digits. Typically, a minimum number of digits needs to be dialed before the originating ISDN switch determines where to route the call. For example, after the user enters XXX-XXX (such as the area code and first three digits of the receiving party's directory number), the originating ISDN switch may determine that these numbers correspond to a destination central office different than the originating ISDN switch and the originating ISDN switch may set up the call to the destination central office by sending a Q.931 CALL PROCEEDING call control message to the ISDN telephone and by sending an IAM message to the destination switch. In one embodiment of the invention, the dialed digits may not be unlocked after the Q.931 CALL PROCEEDING call control message is sent. Some ISDN switches operate using en bloc dialing which means that all the digits of the called number are received before the Q.931 CALL PROCEEDING call control message is sent. However, some central offices operate using overlap dialing (or digit-by-digit dialing) which means that as each digit is received by the originating ISDN switch it is interpreted and the call is routed accordingly as soon as feasible. Thus, for digit-by-digit dialing ISDN switches, there is a point at which the Q.931 CALL PROCEEDING call control message may be sent even before all of the digits of the called number are dialed. When the Q.931 CALL PROCEEDING call control message is sent, the present invention is disabled because the call is already being set-up and it is easier to hang-up the call than to re-route the call. Thus, at decision step 315, it is determined whether a Q.931 CALL PROCEEDING call control message has been sent and, if so, then the method 300 proceeds to step 320 where the dialed digit unlock feature is disabled and the method ends at step 399.

However, if, at decision step 315, it is determined that a Q.931 CALL PROCEEDING call control message has not been sent, then the method 300 proceeds to decision step 325.

At decision step 325, it is determined whether the user has selected to edit the dialed digits. Typically, a key (such as the "#" key or the "*" key) may be used to indicate that the user wants to unlock and edit the dialed digits. Of course, any combination of keys may be used as long as the originating ISDN switch is programmed to understand that the combination of keys activates the dialed digit unlock and edit feature. If, at decision step 325, it is determined that the user has not selected to edit the dialed digits, then the method 300 returns to step 310 where more dialed digits may be received. However, if, at decision step 325, it is determined that the dialed digit unlock and edit feature has been activated, then the method proceeds to step 330.

At step 330, the originating ISDN switch determines how many digits the user wishes to erase and will erase those digits from its record of the dialed number. For example, typically only the last entered digit of the dialed number will be erased. However, in other embodiments of the invention, more than one digit may be erased. For example, if the "#" key is used for the dialed digit unlock and edit feature, then pressing the "#" key twice may erase the last two digits, pressing the "#" key three times may erase the last three digits, etc. If the entire dialed number is erased then the calling party may receive a new dial tone.

The method then returns to step 310 to receive more digits from the digital telephone used by the calling party.

It should be understood that, in a preferred embodiment, the present invention is implemented using software within the originating ISDN switch. The software may contain computer-readable instructions which, when executed, are operable to perform the steps to implement the present invention.

It should be understood that in a preferred embodiment of the invention at least one dialed digit must be entered before the dialed digit unlock and edit feature is functional. It should also be understood that in a preferred embodiment of the invention that after the last digit of a dialed number is entered the dialed digit unlock and edit feature does not function (even for en bloc dialing phones and ISDN switches). However, in other embodiments of the invention, an en bloc originating ISDN switch may be programmed to wait a certain period of time after receiving a complete dialed number so that the user may have a chance to unlock and edit the number if the user catches their error quickly enough.

It should also be understood that the present invention may operate in a private branch exchange (PBX) environment. A PBX is essentially a smaller version of a central office that is owned privately. Thus, by implementing an embodiment of the invention in a PBX, a user making an interoffice or intraoffice telephone call may be able to edit the dialed digits. For example, user may wish to dial extension 1234, but instead enters 124 and then enters a "#" key (or some other designated key) to unlock the dialed digits and edit the extension to 1234. The software of the PBX may be modified to recognize that a "#" key (or another designated key) may be used to unlock and edit dialed digits.

It should also be understood that some digital phones utilize en bloc dialing such that all the digits of a number are collected at the phone and then transmitted as a single block to the central office or PBX. For these en bloc dialing digital phones, software within the phone may be used to unlock and edit the dialed digits. Some digital phones also have displays associated with them. For these display digital phones, a software change may be necessary so that the software of these phones recognizes the dialed digit unlock and edit feature so that the display of the phone is correct. For example, if the "#" key activates the dialed digit unlock and edit feature, then the software of the phone must recognize that the "#" key is being used to activate this feature and remove digits accordingly.

Although the present invention has been described above as implemented in preferred embodiments, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. In a telecommunications system comprising a digital telephone connected to an ISDN network, a method for providing a dialed digit unlock and edit feature, the method comprising the steps of:

receiving at least one digit of a called party number from the digital telephone;

determining whether a Q.931 CALL PROCEEDING call control message has been sent from an originating ISDN switch; and if not, then determining whether a key to enable the dialed digit unlock and edit feature has been entered on the digital telephone and, if so, then erasing the last digit of the called party number received.

2. The method of claim 1 wherein the method is a computer-implemented method comprising computer-readable instructions which, when executed, cause the originating ISDN switch to perform the steps of claim 1.

3. The method of claim 1 wherein the key is a "#" key on the digital telephone.

4. The method of claim 1 wherein the key is a "*" key on the digital telephone.

5. The method of claim 1 wherein the key is a key added to the digital telephone to activate the dialed digit unlock and edit feature.

6. The method of claim 1 further comprising the step of if the Q.931 CALL PROCEEDING call control message has been sent, then disabling the dialed digit unlock and edit feature.

7. The method of claim 1 wherein the key is a combination of keys pressed on the analog telephone.

8. The method of claim 1 wherein the step of erasing comprises erasing as many digits as times the key was pressed.

9. The method of claim 1 further comprising the step of receiving another digit of the called party number from the digital telephone.

10. An ISDN switch in a telecommunications system comprising a digital telephone connected to an ISDN network, wherein the ISDN switch comprises computer-readable instructions, which when executed, are operable to provide a method for providing a dialed digit unlock and edit feature by executing the steps comprising:

receiving at least one digit of a called party number from the digital telephone;

determining whether a Q.931 CALL PROCEEDING call control message has been sent from the ISDN switch; and if not, then determining whether a key to enable the dialed digit unlock and edit feature has been entered on the digital telephone and, if so, then erasing the last digit of the called party number received.

11. The switch of claim 10 wherein the key is a "#" key on the digital telephone.

12. The switch of claim 10 wherein the key is a "*" key on the digital telephone.

13. The switch of claim 10 wherein the key is a key added to the digital telephone to activate the dialed digit unlock and edit feature.

14. The switch of claim 10 further comprising computer-executable instructions operable to perform the step of if the Q.931 CALL PROCEEDING call control message has been sent, then disabling the dialed digit unlock and edit feature.

15. The switch of claim 10 wherein the key is a combination of keys pressed on the analog telephone.

16. The switch of claim 10 wherein the step of erasing comprises erasing as many digits as times the key was pressed.

17. The switch of claim 10 further comprising computer-executable instructions operable to perform the step of receiving another digit of the called party number from the digital telephone.

* * * * *

UNITED STATES PATENT AND TRADEMARK OFFICE
CERTIFICATE OF CORRECTION

PATENT NO. : 6,778,658 B1
DATED : August 17, 2004
INVENTOR(S) : McDonald et al.

It is certified that error appears in the above-identified patent and that said Letters Patent is hereby corrected as shown below:

Column 2,
Line 29, "network (AN) will" should read -- network (AIN) will --
Line 30, "The modem public" should read -- The modern public --

Column 4,
Line 56, "other finctions." should read -- other functions. --

Signed and Sealed this

Twenty-second Day of March, 2005

JON W. DUDAS
*Director of the United States Patent and Trademark Office*